(12) United States Patent
Kurosawa

(10) Patent No.: US 9,969,567 B2
(45) Date of Patent: May 15, 2018

(54) METHOD AND DEVICE FOR CONVEYING ARTICLES

(71) Applicant: TOYO SEIKAN CO., LTD., Tokyo (JP)

(72) Inventor: Kazuyuki Kurosawa, Tokyo (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days. days.

(21) Appl. No.: 15/426,248

(22) Filed: Feb. 7, 2017

(65) Prior Publication Data
US 2017/0152114 A1    Jun. 1, 2017

Related U.S. Application Data

(63) Continuation of application No. PCT/JP2015/069774, filed on Jul. 9, 2015.

(30) Foreign Application Priority Data

Aug. 8, 2014   (JP) .................... 2014-163094

(51) Int. Cl.
*B67C 3/24* (2006.01)
*B67C 7/00* (2006.01)
*B65G 47/84* (2006.01)

(52) U.S. Cl.
CPC .............. *B65G 47/846* (2013.01); *B67C 3/24* (2013.01); *B67C 7/004* (2013.01); *B65G 2201/0235* (2013.01)

(58) Field of Classification Search
CPC .......... B65G 47/846; B67C 3/24; B67C 7/004
See application file for complete search history.

(56) References Cited

U.S. PATENT DOCUMENTS 4,467,908 A * 8/1984 Schneider .............. B65G 47/71
                                                    198/441
5,014,491 A * 5/1991 Tsukada ................. B21D 51/32
                                                    413/52
(Continued)

FOREIGN PATENT DOCUMENTS

GB         2107666 A       5/1983
JP         58-135027 A     8/1983
(Continued)

OTHER PUBLICATIONS

International Search Report dated Oct. 13, 2015, issued in counterpart International Application No. PCT/JP2015/069774 (1 page).
(Continued)

*Primary Examiner* — Thomas Randazzo
(74) *Attorney, Agent, or Firm* — Westerman, Hattori, Daniels & Adrian, LLP

(57) ABSTRACT

In transferring and conveying an article between rotation conveyance bodies, the rotation conveyance bodies (1, 2) are placed so as to have a prescribed gap between pitch circles thereof, and the article is conveyed along a transition curve whose curvature continuously varies from the pitch circle curvature of a rotation conveyance body (1) before the transfer to the pitch circle curvature of a rotation conveyance body (2) after the transfer between both the pitch circles, whereby the article is transferred and conveyed with acceleration smoothly varying and without a change in the distance between the axes of the rotation conveyance bodies.

6 Claims, 3 Drawing Sheets

(56) References Cited

U.S. PATENT DOCUMENTS

| | | | | |
|---|---|---|---|---|
| 5,341,620 A * | 8/1994 | Katou | ................... | B65G 47/846 |
| | | | | 198/480.1 |
| 5,772,001 A * | 6/1998 | Otruba | ................. | B65G 47/846 |
| | | | | 198/459.2 |
| 9,187,262 B2 * | 11/2015 | Fahldieck | ............. | B67C 7/0046 |
| 9,452,600 B2 * | 9/2016 | Coates | ................ | B41F 17/002 |
| 2017/0348757 A1 * | 12/2017 | Kurosawa | .............. | B21D 51/32 |

FOREIGN PATENT DOCUMENTS

| | | | | |
|---|---|---|---|---|
| JP | 5-59008 B2 | 8/1993 | | |
| JP | 9-142649 A | 6/1997 | | |
| JP | 2001-287794 A | 10/2001 | | |
| JP | 2001287794 A * | 10/2001 | ............... | B67C 3/24 |

OTHER PUBLICATIONS

Written Opinion dated Oct. 13, 2015, issued in counterpart International Application No. PCT/JP2015/069774 (6 pages, including the cover sheet).

\* cited by examiner

METHOD AND DEVICE FOR CONVEYING ARTICLES

TECHNICAL FIELD

The present invention relates to a method and a device for conveying articles and, in particular, to a method and a device for conveying articles in which the articles are transferred from circular conveyance to circular conveyance between rotation conveyance bodies.

BACKGROUND ART

When articles such as cylindrical containers (hereinafter simply called containers or articles) are conveyed between turrets, rotors, star wheels, or the like (hereinafter collectively called turrets or rotation conveyance bodies) having pockets at even intervals at outer peripheral parts thereof, the turrets are generally placed so as to make the pitch circles of the pockets contact each other, and rotate at the same peripheral speeds so as to transfer objects from the turret on an upstream side to the turret on a downstream side. In this case, a change in acceleration applied to the conveyed containers becomes infinite, causing scratches, dents, or the like in the containers while also causing abrasion in guides or the like. This problem has in recent years become particularly pronounced as fillers or seamers using can bodies achieve higher speeds and can members are made thinner.

Meanwhile, as a device for transferring and conveying articles between rotation conveyance bodies having pitch circles that do not contact each other, a distribution device is available (see Patent Literature 1) in which, in order to perform alternate distribution from one rotor (turret) to two turrets, the device has at first transfer positions provided in every second pocket pressing plates that are forcibly controlled so as to move bottles outward in a radial direction, and in which the conveyance speed of the bottles is suddenly decelerated down to the speed of the other rotor, or as another example, a container feed device is available (see Patent literature 2) in which a filler body and a star wheel for supplying containers to the filler body are placed such that pitch circles thereof are spaced away from each other by a prescribed offset amount, and in which a guide is placed so as to make the conveyance track of the containers from the star wheel to the filler body follow a connection curve formed by a spiral curve having a curvature that continuously varies from a curvature corresponding to that of the pitch circle of the star wheel to a curvature corresponding to that of the pitch circle of the filler body.

CITATION LIST

Patent Literature

Patent Literature 1: Japanese Examined Patent Publication No. H05-59008
Patent Literature 2: Japanese Patent Application Laid-open No. H9-142649
Patent Literature 3: Japanese Patent Application Laid-open No. 2001-287794

SUMMARY OF INVENTION

Technical Problem

Among the above conventional devices for transferring and conveying articles between turrets whose pitch circles are offset from each other, the former device gradually moves the bottles held in the pockets outward in the radial direction using the pressing plates so as to perform the transfer between the turrets, but there is no indication of an idea about a continuous variation in acceleration, and moreover, the device structure is complex because the pocket parts need special pressing plates or attachments. Therefore, it is difficult to apply the device to high-speed manufacturing lines. On the other hand, the latter device can prevent a sudden change in acceleration, but here, it is necessary to support the cans with the pockets of the transferring-side turret (the star wheel). Therefore, structural restriction is placed on the device since the outer diameter of the transferring-side turret needs to be larger than a pitch circle diameter, and the distance between the axes of the turrets needs to be modified since the turrets that are supposed to be placed with pitch circles thereof being in mutual contact is placed away from each other, which causes problems that cannot be solved through mere modification of existing facilities.

In these circumstances, the present invention has an object of providing a method and a device for conveying articles in which, when articles are transferred and conveyed between turrets, acceleration in transferring and conveying the articles between the turrets varies smoothly and a change in the distance between the axes of the turrets is not required.

Solution to Problem

In order to solve the above problems, the present invention provides a method for conveying an article in which the article is transferred from circle conveyance to circle conveyance between rotation conveyance bodies, wherein the rotation conveyance bodies are placed so as to have a prescribed gap between pitch circles thereof, and the article is conveyed along a transition curve of which curvature continuously varies from a pitch circle curvature of the rotation conveyance body before the transfer to a pitch circle curvature of the rotation conveyance body after the transfer between both the pitch circles.

In addition, circular pitches between adjacent pockets of the rotation conveyance bodies are preferably different from each other, and a conveyance speed between the rotation conveyance bodies preferably continuously varies from a peripheral speed of the circle conveyance before the transfer to a peripheral speed of the circle conveyance after the transfer.

Moreover, a ratio between angular speeds of the rotation conveyance bodies is preferably equal to a ratio between inverse numbers of the number of pockets of the respective rotation conveyance bodies.

Further, the article is preferably conveyed between the rotation conveyance bodies along a conveyance guide having a guide surface of an offset transition curve obtained by offsetting the transition curve.

Furthermore, the transition curve preferably employs any of curves $c_1$ to $c_4$ calculated by any of following mathematical formulae 1 to 4.

$$c_1(s) = \left[\frac{1}{\alpha}\int_0^{\alpha \cdot s} \cos\left(\frac{\sigma^2}{2}\right)d\sigma, \frac{1}{\alpha}\int_0^{\alpha \cdot s} \sin\left(\frac{\sigma^2}{2}\right)d\sigma\right] \quad \text{[Math. 1]}$$

(Here, s represents a length of a curve, and $\alpha$ is determined by a length of a transition curve and a pitch circle radius of a rotation conveyance body.)

$$c_2(s) = \left\{ \int_0^s \cos\left[\frac{\sigma^{n+1}}{R \cdot s_R^n(n+1)}\right] d\sigma, \int_0^s \sin\left[\frac{\sigma^{n+1}}{R \cdot s_R^n(n+1)}\right] d\sigma \right\}$$ [Math. 2]

(Here, it is defined that a curvature κ of a transition curve changes by a following function $$\kappa = \frac{1}{R} \cdot \left(\frac{s}{s_R}\right)^n$$

where s represents a length of a curve (parameter), $s_R$ represents a length of a transition curve, R represents a pitch circle radius of a rotation conveyance body, and n represents a parameter showing a degree of change in curvature.)

$$c_3(t) = \left[\frac{\beta}{\alpha}\int_0^{\alpha t} \cos\left(\frac{\tau^2}{2}\right) d\tau, \frac{1}{\alpha}\int_0^{\alpha t} \sin\left(\frac{\tau^2}{2}\right) d\tau\right]$$ [Math. 3]

(Here, β represents a parameter showing a degree of change in curvature, and t and α are determined by a length of a transition curve and a pitch circle radius of a rotation conveyance body.)

$$c_4(s) = \left(\int_0^s \cos\left\{\int_0^\sigma \frac{1}{R} \cdot \sin^2\left[\frac{\pi}{2}\left(\frac{\tau}{s_R}\right)^n\right] d\tau\right\} d\sigma, \right.$$
$$\left. \int_0^s \sin\left\{\int_0^\sigma \frac{1}{R} \cdot \sin^2\left[\frac{\pi}{2}\left(\frac{\tau}{s_R}\right)^n\right] d\tau\right\} d\sigma \right)$$ [Math. 4]

(Here, it is defined that a curvature κ of a transition curve changes by a following function $$\kappa = \frac{1}{R} \cdot \sin^2\left[\frac{\pi}{2}\left(\frac{s}{s_R}\right)^n\right]$$

where s represents a length of a curve (parameter), $s_R$ represents a length of a transition curve, R represents a pitch circle radius of a rotation conveyance body, and n represents a parameter showing a degree of change in curvature.)

In order to solve the above problems, the present invention provides a device for conveying an article in which the article is transferred from circle conveyance to circle conveyance between rotation conveyance bodies, the device including: a transferring-side rotation conveyance body having pockets at even intervals at an outer peripheral part thereof; and a transferred-side rotation conveyance body having pockets at even intervals at an outer peripheral part thereof, wherein the transferring-side rotation conveyance body and the transferred-side rotation conveyance body are placed so as to have a prescribed gap between pitch circles of the circle conveyance thereof, a conveyance guide for conveying the article along a prescribed track between the transferring-side rotation conveyance body and the transferred-side rotation conveyance body is provided, and a guide surface of the conveyance guide has a shape of an offset transition curve obtained by offsetting a transition curve of which curvature continuously varies from a pitch circle curvature of the circle conveyance before the transfer to a pitch circle curvature of the circle conveyance after the transfer.

In addition, the transferring-side rotation conveyance body and the transferred-side rotation conveyance body preferably have a reduced pitch circle radius in one of the rotation conveyance bodies without a change in positions of axes of virtual rotation conveyance bodies that transfer the article with pitch circles thereof contacting each other, a conveyance speed between the rotation conveyance bodies preferably continuously varies from a peripheral speed of the circle conveyance before the transfer to a peripheral speed of the circle conveyance after the transfer, and a ratio between angular speeds of the transferring-side rotation conveyance body and the transferred-side rotation conveyance body is preferably equal to a ratio between inverse numbers of the number of pockets of the respective rotation conveyance bodies.

Moreover, the transition curve is preferably represented by any of curves $c_1$ to $c_4$ calculated by any of the above mathematical formulae 1 to 4.

Further, the pockets of the rotation conveyance bodies preferably form article guide parts of which arc-shaped opening ends protrude outward from the corresponding pitch circles, and the article guide parts and the pockets are preferably shaped so as to come in contact with the article conveyed at the conveyance speed continuously varying from the peripheral speed of the circle conveyance before the transfer to the conveyance speed of the circle conveyance after the transfer.

Advantageous Effects of Invention

According to a method and a device for conveying an article of the present invention, the pitch circles of rotation conveyance bodies do not contact each other, and the article can be transferred to a rotation conveyance body on a downstream side by smoothly varying acceleration applied to the conveyed article such as a container even if the peripheral speeds of the rotation conveyance bodies are different from each other. Therefore, there is less damage to the conveyed article, and the occurrence of dents or scratches in the article can be reduced.

In addition, according to the method for conveying the article of the present invention, the conveyance speed between the rotation conveyance bodies continuously varies from the peripheral speed of circle conveyance before the transfer to the peripheral speed of circle conveyance after the transfer. Therefore, the article can be smoothly transferred to a transferred-side rotation conveyance body.

Moreover, according to the method for conveying the article of the present invention, the article is conveyed between the rotation conveyance bodies along a conveyance guide having the guide surface of an offset transition curve obtained by offsetting a transition curve of which curvature continuously varies. Therefore, the article can be stably conveyed.

Further, according to the method and the device for conveying the article of the present invention, the acceleration applied to the article can be continuously and smoothly varied by using a curve defined by the above mathematical formula as the shape of the surface of the conveyance guide.

Furthermore, according to the device for conveying the article of the present invention, it is possible to employ existing devices or facilities without changing the distance between the axes of their rotation conveyance bodies. Therefore, the existing facilities can be easily and inexpensively updated.

Furthermore, according to the device for conveying the article of the present invention, pockets protrude outward from a pitch circle, and the conveyance speed of the article is restricted so as to continuously vary. Therefore, the article can be stably transferred.

REFERENCE SIGNS LIST

Figure 1A:
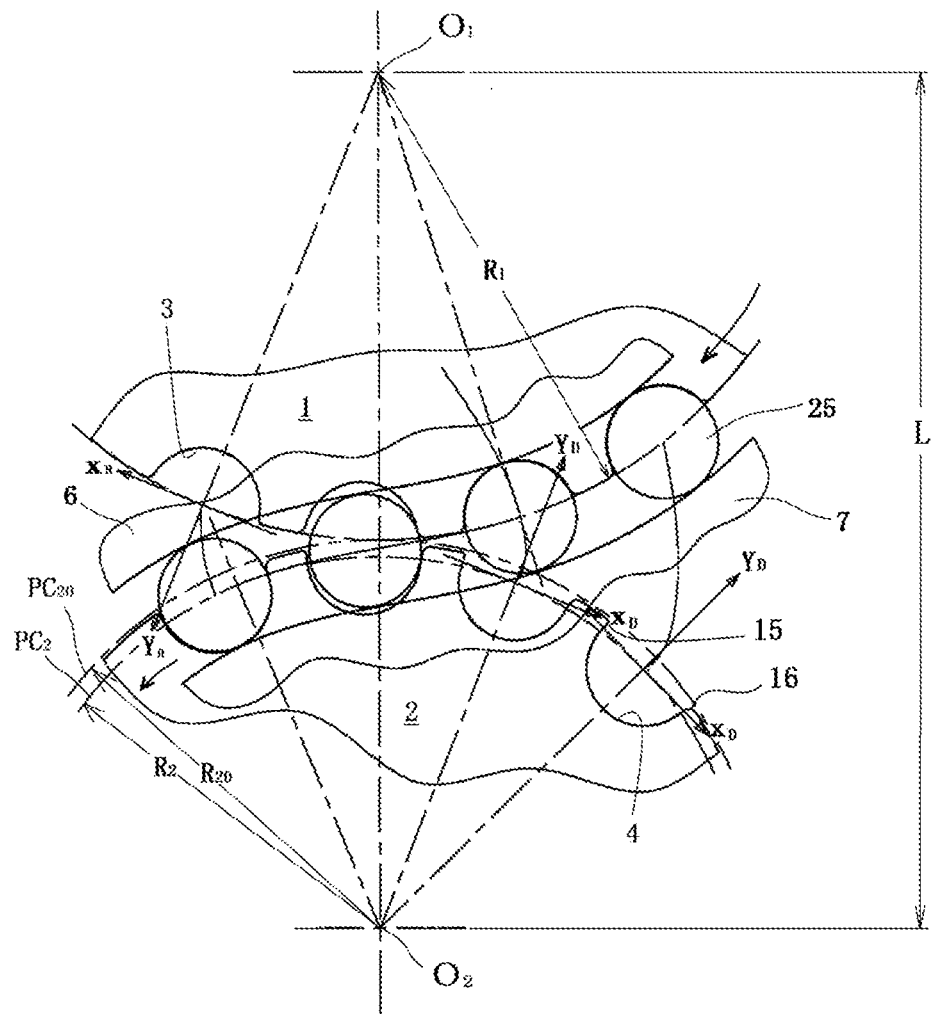
FIG. 1A-1C is a schematic diagram showing an embodiment of a method and a device for conveying articles of the present invention.

1 Seaming turret (Rotation conveyance body)
2 Discharge turret (Rotation conveyance body)
3,4 Pocket
5 Discharge conveyor
6 Outer guide
7 Inner guide
10 Forward-movement conveyor
11 Cover feed turret
20 Cover can
25 Can body
$R_1$ Pitch circle radius of seaming turret
$R_2$ Pitch circle radius of discharge turret
$R_{20}$ Pitch circle radius of conventional discharge turret

DESCRIPTION OF EMBODIMENTS

Hereinafter, based on the drawings, a description will be given in detail of a method and a device for conveying articles in which the articles are transferred and conveyed from circle conveyance to circle conveyance between rotation conveyance bodies according to the present invention.

Figure 1B:
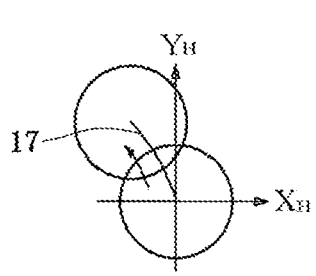
Figure 1C:
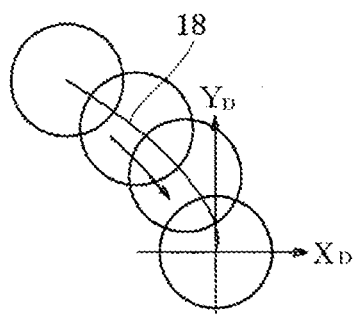
Figure 2:
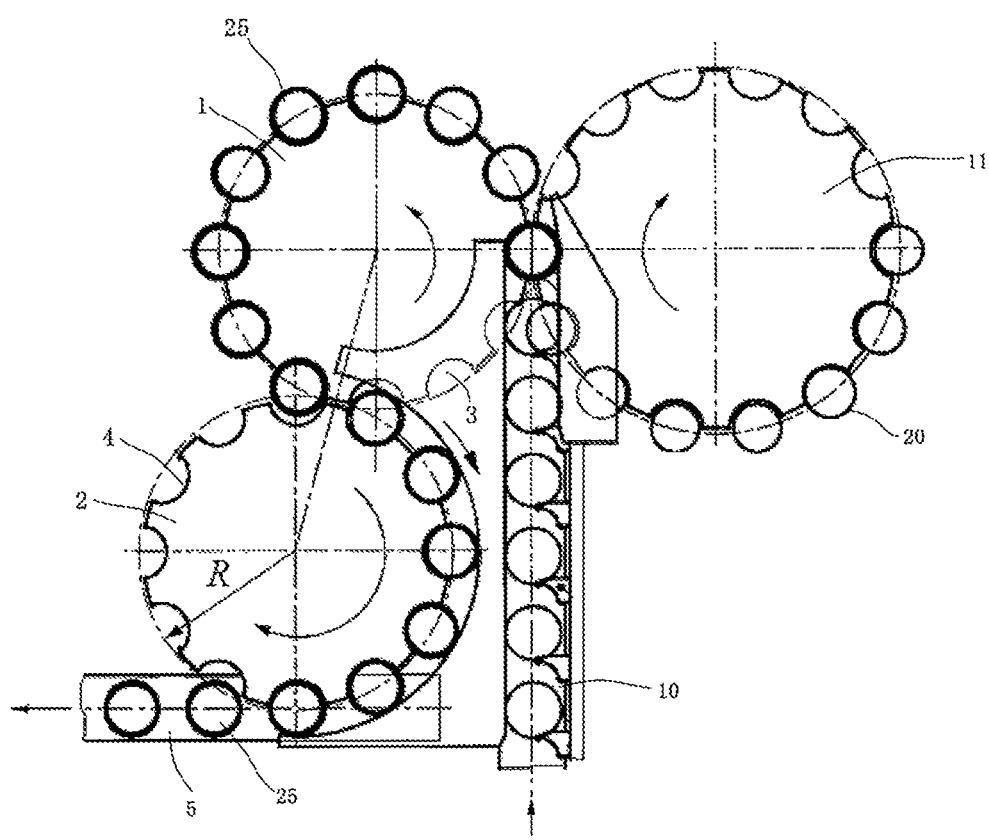
FIG. 2 is a schematic diagram showing the flow of can bodies when the present invention is applied to a can-body seamer.

FIG. 1A-1C shows an embodiment in which the present invention is applied to the transfer part between a seaming turret (half-mold turret) 1 and a discharge turret 2 of a can seamer, the seaming turret 1 seaming and sealing can covers after a content is filled in cylindrical can bodies, the discharge turret 2 discharging the can bodies having been subjected to the filling and sealing processes. The basic configuration of the can seamer is the same as a conventional one, and the can bodies in which a content such as a beverage is filled by a filler are conveyed by a forward-movement conveyor 10 as shown in FIG. 2 in flowing the can bodies with the can seamer. Next, the can bodies are transferred to the seaming turret 1 after can covers 20 are laid over the can bodies by a cover feed turret 11 and seamed while being held in pockets 3 of the seaming turret 1 and conveyed along a circular orbit. After that, the can bodies 25 with their can covers seamed are transferred from the seaming turret 1 to the discharge turret 2, moved along a circular orbit while being held in pockets 4 of the discharge turret 2, and transferred to the discharge conveyor 5 to be conveyed to a next process.

In order to allow the cans to be transferred between the seaming turret 1 and the discharge turret 2 rotating each other, such a can seamer is conventionally configured such that the pitch circles of the seaming turret 1 and the discharge turret 2 contact each other, the peripheral speeds of the seaming turret 1 and the discharge turret 2 are made coincident with each other, and the ratio between the rotation angular speeds of the respective turrets is equal to the ratio between the inverse numbers of the number of the pockets of the respective turrets.

Here, consideration is given to a case in which an article is transferred and conveyed from a turret having a pitch circle radius $R_1$ to a turret having a pitch circle radius $R_{20}$. When the number of the pockets of the respective turrets is represented as $p_1$ or $p_2$, an angular speed $\omega_2$ of a turret on a downstream side is represented as $\omega_2 = (p_1/p_2) \omega_1$ when the angular speed of a turret on an upstream side is represented as $\omega_1$. Accordingly, when the pitch circle radius after the transfer in the related art in which the article is conveyed with the pitch circles of the circle-conveyance turrets contacting each other is represented as $R_{20}$, the relationship between a conveyance speed $v_1$ of the turret on the upstream side and a conveyance speed $v_2$ of the turret on the downstream side for conveying the article is represented as $v_1 = v_2 = R_1 \cdot \omega_1 = R_{20} \cdot \omega_2$.

In order to solve the above problems in the circle-conveyance transfer between the conventional turrets, the present invention is configured such that the pitch-circle peripheral speeds of the respective turrets are made different from each other and $v_2$ is made smaller than $v_1$.

That is, since the pitch circle radius after the transfer is set at $R_2$ smaller than $R_{20}$ by $\Delta R$, $v_2$ becomes smaller than $v_1$, i.e., $v_2 = R_2 \cdot \omega_2 < R_{20} \cdot \omega_2$.

Further, in order to achieve the above configuration, the seaming turret 1 and the discharge turret 2 are placed to be spaced away from each other so as to have a prescribed gap between the pitch circles of their circle conveyance. As described above, between the turrets placed to be spaced away from each other so as to have a prescribed gap between them, (1) the conveyed body (can body) is conveyed along a curve whose curvature continuously varies by a conveyance guide to continuously vary (centrifugal) acceleration applied to the conveyed body (can body), and (2) the conveyance speed is continuously decelerated from $v_1$ to $v_2$ to continuously vary acceleration (in a conveyance direction).

In FIG. 1A, the distance between axes $O_1$ and $O_2$ of the seaming turret 1 and the discharge turret 2 serving as rotation conveyance bodies is the same as the distance between the axes of the conventional turrets placed with their pitch circles contacting each other. Further, in the embodiment, the pitch circle of the discharge turret 2 is set to have the radius $R_2$ smaller than the conventional pitch circle radius $R_{20}$. That is, as the combination of a virtual seaming turret and a virtual discharge turret that transfer a can body from circle conveyance to circle conveyance with the pitch circles of both rotation conveyance bodies contacting each other, the seaming turret 1 and the discharge turret 2 are configured such that the pitch circle radius of the discharge turret 2 serving as one rotation conveyance body is small and the circular pitches (arc pitches) between the adjacent pockets of the seaming turret 1 and the discharge turret 2 are different from each other without changing the positions of the axes of the seaming turret 1 and the discharge turret 2.

In FIG. 1A, $PC_{20}$ represents the pitch circle of the conventional discharge turret having the pitch circle radius $R_{20}$, and PC represents the pitch circle of the discharge turret 2 having the pitch circle radius $R_2$ of the embodiment. Further, in the embodiment, a track curve traced by the can body conveyed between the circle-conveyance turrets has a curvature continuously varying from a pitch circle curvature $1/R_1$ of circle conveyance before the transfer to a pitch circle curvature $1/R_2$ of circle conveyance after the transfer. In addition, the conveyance speed of the can body 25 conveyed between the circle conveyance and the circle conveyance continuously varies from the peripheral speed $v_1$ of the circle conveyance before the transfer to the peripheral speed $v_2$ of the circle conveyance after the transfer.

In order to reliably and continuously vary the curvature of the track curve from the pitch circle curvature $1/R_1$ of the circle conveyance before the transfer to the pitch circle curvature $1/R_2$ of the circle conveyance after the transfer in the transfer section between the turrets, an outer guide 6 and an inner guide 7 whose guide surface has the shape of an offset transition curve varying at the same curvature are placed along the transfer part.

Further, as a transition curve whose curvature continuously varies, a curve known as a clothoid curve whose curvature changes in proportion to the length of the curve and three types of curves as shown in Patent Literature 3 can be applied. The curves described in Patent Literature 3 have been invented and raised by the present inventor as connection curves used to transfer a container from a circular orbit to a linear orbit in a filler, but have been applied to the present invention with attention paid to the fact that the curves are also applicable to a transition curve from a circular orbit to a circular orbit.

Figure 3:
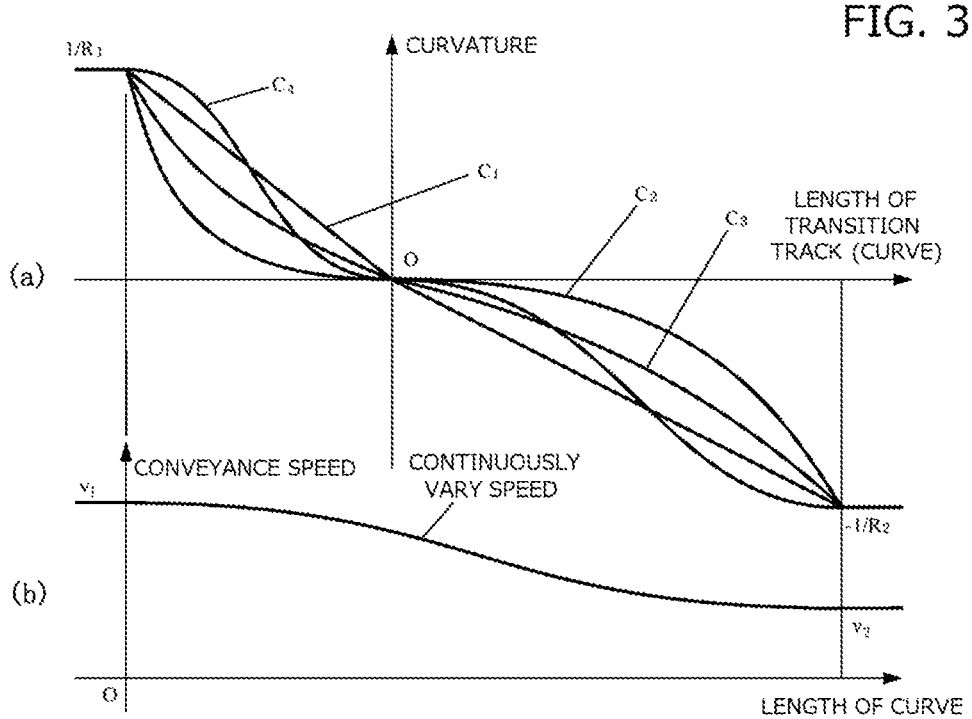
FIG. 3 is a diagram showing a variation in the curvature of the track curve of the conveyed articles and a variation in conveyance speed in the embodiment of the present invention.

As such a transition curve, any of the four types of curves $c_1$, $c_2$, $c_3$, and $c_4$, each of which is shown in FIG. 3 and will be described below, is employed in the embodiment. All these curves are curves that continuously varying from the curvature $1/R_1$ of the turret 1 to the curvature $-1/R_2$ of the turret 2, the curvature continuously varying from a positive value to a negative value without bending in mid course. However, the curves $c_1$, $c_2$, $c_3$, and $c_4$, each of which will be described below, show a section in which the curvature of the turret changes from $1/R_1$ to zero. For a section in which the curvature of the turret changes from zero to $-1/R_2$, the curve in which the curvature of the turret changes from $1/R_1$ to zero can be used by replacing $-R_2$ with $R_1$. Accordingly, $R_1$ and $R_2$ will be simply described as a curvature radius R of the turret.

The transition curve $c_1$ is calculated by mathematical formula 1.

$$c_1(s) = \left[\frac{1}{\alpha}\int_0^{\alpha \cdot s}\cos\left(\frac{\sigma^2}{2}\right)d\sigma, \frac{1}{\alpha}\int_0^{\alpha \cdot s}\sin\left(\frac{\sigma^2}{2}\right)d\sigma\right] \quad \text{[Math. 1]}$$

Here, s represents a length of a curve. Note that a parameter $\alpha$ is determined by a length $s_R$ of a transition curve and a pitch circle radius R of a rotation conveyance body.

$$\alpha = \frac{1}{\sqrt{s_R \cdot R}}$$

Further, the transition curve $c_2$ is calculated by $$c_2(s) = \left\{\int_0^s \cos\left[\frac{\sigma^{n+1}}{R \cdot s_R^n(n+1)}\right]d\sigma, \int_0^s \sin\left[\frac{\sigma^{n+1}}{R \cdot s_R^n(n+1)}\right]d\sigma\right\} \quad \text{[Math. 2]}$$

Here, it is defined that a curvature $\kappa$ of a transition curve changes by the following function.

$$\kappa = \frac{1}{R} \cdot \left(\frac{s}{s_R}\right)^n$$

Here, s represents a length of a curve, $s_R$ represents a length of a transition curve, R represents a pitch circle radius of a rotation conveyance body, and n represents a parameter showing a degree of change in curvature.

The transition curve $c_3$ is represented by mathematical formula 3.

$$c_3(t) = \left[\frac{\beta}{\alpha}\int_0^{\alpha t}\cos\left(\frac{\tau^2}{2}\right)d\tau, \frac{1}{\alpha}\int_0^{\alpha t}\sin\left(\frac{\tau^2}{2}\right)d\tau\right] \quad \text{[Math. 3]}$$

Here, $\beta$ represents a parameter showing a degree of change in curvature, and a length s of a curve is calculated by mathematical formula 3-1.

$$s(t) = \int_0^t \sqrt{\beta^2\cos^2\left(\frac{\alpha^2\tau^2}{2}\right) + \sin^2\left(\frac{\alpha^2\tau^2}{2}\right)}\,d\tau \quad \text{[Math. 3-1]}$$

Further, a curvature $\kappa$ of a curve is calculated by mathematical formula 3-2.

$$\kappa(t) = \frac{2\sqrt{2}\,\alpha^2\beta t}{[\beta^2 + 1 + (\beta^2 - 1)\cos(\alpha^2 t^2)]^{\frac{3}{2}}} \quad \text{[Math. 3-2]}$$

From mathematical formulae 3-1 and 3-2, parameters t and $\alpha$ can be determined based on a length of a transition curve and a pitch circle radius of a rotation conveyance body relative to any value of a parameter $\beta$ showing a degree of change in curvature. Accordingly, the transition curve $c_3$ can be calculated by mathematical formula 3.

The transition curve $c_4$ is represented by mathematical formula 4.

$$c_4(s) = \left(\int_0^s \cos\left\{\int_0^\sigma \frac{1}{R}\cdot\sin^2\left[\frac{\pi}{2}\left(\frac{\tau}{s_R}\right)^n\right]d\tau\right\}d\sigma, \int_0^s \sin\left\{\int_0^\sigma \frac{1}{R}\cdot\sin^2\left[\frac{\pi}{2}\left(\frac{\tau}{s_R}\right)^n\right]d\tau\right\}d\sigma\right) \quad \text{Math. 4]}$$

Here, it is defined that a curvature $\kappa$ of a transition curve changes by the following function.

$$\kappa = \frac{1}{R} \cdot \sin^2\left[\frac{\pi}{2}\left(\frac{s}{s_R}\right)^n\right]$$

Here, s represents a length of a curve (parameter), $s_R$ represents a length of a transition curve, R represents a pitch circle radius of a rotation conveyance body, and n represents a parameter showing a degree of change in curvature.

FIG. 3(a) shows a change in curvature relative to a length along a curve when each of the above transition curves $c_1$ to $c_4$ is applied to a transition track for the transfer from the circular orbit to the circular orbit between the seaming turret 1 having the pitch circle radius $R_1$ and the discharge turret 2 having the pitch circle radius $R_2$, and FIG. 3 (b) shows a speed diagram in which the speed at that time continuously varies.

In the embodiment, the seaming turret 1 and the discharge turret 2 are placed as in the related art such that a distance L between the axes $O_1$ and $O_2$ of the turrets satisfies $L=R_1+R_{20}$ when the pitch circle radius of the seaming turret 1 is represented as $R_1$ and the pitch circle radius of the discharge turret 2 is represented as $R_{20}$. Further, the outer guide 6 and the inner guide 7, each of which has a guide surface formed by an offset transition curve obtained by offsetting a transition curve to move the axis of the can body from the seaming turret 1 to the discharge turret 2 along any of the above transition tracks according to the size of the article, are placed such that a gap K relative to a diameter D (pocket fitting position) of the can body satisfies K≥D. Note that the outer guide 6 and the inner guide 7 are placed along both sides of the transition track in the embodiment, but are not necessarily placed on both sides. It is also possible to place the guide only on one of the sides or place the inner guide only at a half part of the transition track and the outer guide only at another half part of the transition track.

As shown in FIG. 3, each of the curves starts with the curvature $1/R_1$ of the turret 1 at a position at which the transfer from the turret 1 starts, and coincides with the curvature $(-1/R_2)$ of the discharge turret 2 at a position at which the transfer to the discharge turret 2 ends. Between these positions, the curvature continuously varies. As a result, centrifugal acceleration applied to the can body varies continuously and smoothly to lessen an impact. In addition, the peripheral speed $v_1$ of the seaming turret 1 continuously decelerates to the peripheral speed $v_2$ of the discharge turret 2 to continuously vary the acceleration in the conveyance direction.

In FIG. 3(a), the vertical axis represents the curvature, and the horizontal axis represents the length of the transition track (curve). In addition, FIG. 3(b) shows a change in conveyance speed, by which to indicate that the conveyance speed $v_1$ at the seaming turret 1 decelerates smoothly and continuously to the conveyance speed $v_2$ at the discharge turret 2 on the transition track to transfer the can body to the discharge turret 2.

Note that different transition curves can also be used between the section in which the curvature starts with the curvature $1/R_1$ of the turret 1 and becomes zero and the section in which the curvature starts with zero and coincides with the curvature $(-1/R_2)$ of the discharge turret 2. For example, the transition curve $c_1$ whose curvature changes in proportion to the length of the curve may be used in the section in which the curvature starts with the curvature $1/R_1$ of the turret 1 and becomes zero, and the transition curve $c_2$ whose curvature changes in a curve relative to the length of the curve may be used in the section in which the curvature starts with zero and coincides with the curvature $(-1/R_2)$ of the discharge turret 2.

As shown in FIG. 1A, arc-shaped opening ends 15 and 16 of the pockets 4 of the discharge turret 2 can be formed to protrude outward from the pitch circle radius $R_2$ corresponding to an amount at which the pitch circle radius $R_2$ is smaller than the conventional pitch circle radius $R_{20}$.

Note that a diagram 17 in FIG. 1B shows the track of a container moving away from the pocket 3 of the seaming turret 1, and a tangential direction and a normal line direction with a pitch circle relative to the axis $O_1$ passing through the center of the pocket 3 are represented as $x_H$ and $y_H$, respectively. Similarly, a diagram 18 in FIG. 1C shows the track of a container moving into the pocket 4 of the discharge turret 2, a tangential direction and a normal line direction with a pitch circle relative to the axis $O_2$ passing through the center of the pocket 4 are represented as $x_D$ and $y_D$, respectively. Based on these directions, the shapes of the pockets and the arc-shaped opening ends of the respective turrets can be determined.

Note that in the embodiment, the arc-shaped opening ends of the pockets 4 of the discharge turret 2 are formed so as to protrude from the pitch circle radius $R_2$ in order to more reliably transfer the article, but such configuration is not limiting and the arc-shaped opening ends of the pockets 3 of the seaming turret 1 may protrude outward from the pitch circle radius, or the arc-shaped opening ends of the pockets of both turrets may protrude.

As described above, the present invention makes it possible to continuously and smoothly vary acceleration applied to can bodies in the process of conveying the can bodies from a circular orbit to a circular orbit. As a result, it becomes possible to more stably convey articles such as containers than ever before in high-speed production, whereby the occurrence of problems such as deformation and scratches caused by a contact with conveyance guides or the like can be reduced. In addition, the present invention is constituted by reducing the pitch circle radius of one of turrets without changing the distance between the axes of the turrets in conventional devices for conveying articles between the turrets, and can be achieved by simply modifying existing devices or facilities.

Note that the present invention is applied to the part between the seaming turret and the discharge turret of the can seamer. However, it is also possible to apply the present invention not only to the above embodiment but also to, for example, various facilities such as neckers and trimmers in lines for manufacturing can bodies or the transfer and conveyance of articles between various turrets in lines for manufacturing plastic bottles, paper containers, or the like as the transfer of the articles from a circular orbit to a circular orbit.

INDUSTRIAL APPLICABILITY

The present invention is high in industrial applicability as a method and a device for conveying articles in which the articles are transferred from a circular orbit to a circular orbit without damaging the conveyed articles.

The invention claimed is:

1. A method for conveying an article, comprising the steps of:
transferring the article between rotation conveyance bodies, the rotation conveyance bodies having a prescribed gap between pitch circles thereof; and
conveying the article along a transition curve having a curvature that continuously varies from a first pitch circle curvature of one of the rotation conveyance bodies before transfer to a second pitch circle curvature of another one of the rotation conveyance bodies, wherein
said conveying of the article between the rotation conveyance bodies is along a conveyance guide having a guide surface assuming an offset transition curve obtained by offsetting the transition curve,
one of the conveyance bodies having a reduced pitch circle radius without a change in positions of axes of virtual rotation conveyance bodies that transfer the article with pitch circles thereof contacting each other,
said conveying is at a conveyance speed between the rotation conveyance bodies that continuously varies from a peripheral speed of the one of the rotation conveyance bodies before the transfer to a peripheral speed of the another one of the rotation conveyance bodies after the transfer, and a ratio between angular speeds of the one of the rotation conveyance bodies before the transfer and the another one of the rotation conveyance bodies after the transfer is equal to a ratio between inverse numbers of the number of pockets of the respective rotation conveyance bodies.

2. The method for conveying the article according to claim 1, wherein circular pitches between adjacent pockets of the rotation conveyance bodies are different from each other.

3. The method for conveying the article according to claim 1, wherein
the transition curve is represented by any of curves $c_1$ to $c_4$ calculated by any of following mathematical formulae 1 to 4:

$$c_1(s) = \left[\frac{1}{\alpha}\int_0^{\alpha \cdot s} \cos\left(\frac{\sigma^2}{2}\right)d\sigma, \frac{1}{\alpha}\int_0^{\alpha \cdot s} \sin\left(\frac{\sigma^2}{2}\right)d\sigma\right] \quad \text{[Math. 1]}$$

(where s represents a length of a curve, and $\alpha$ is determined by a length of a transition curve and a pitch circle radius of a rotation conveyance body)

$$c_2(s) = \left\{\int_0^s \cos\left[\frac{\sigma^{n+1}}{R \cdot s_R^n(n+1)}\right]d\sigma, \int_0^s \sin\left[\frac{\sigma^{n+1}}{R \cdot s_R^n(n+1)}\right]d\sigma\right\} \quad \text{[Math. 2]}$$

(where it is defined that a curvature $\kappa$ of a transition curve changes by a following function $$\kappa = \frac{1}{R} \cdot \left(\frac{s}{s_R}\right)^n$$

where s represents a length of a curve, $S_R$ represents a length of a transition curve, R represents a pitch circle radius of a rotation conveyance body, and n represents a parameter showing a degree of change in curvature)

$$c_3(t) = \left[\frac{\beta}{\alpha}\int_0^{\alpha t} \cos\left(\frac{\tau^2}{2}\right)d\tau, \frac{1}{\alpha}\int_0^{\alpha t} \sin\left(\frac{\tau^2}{2}\right)d\tau\right] \quad \text{[Math. 3]}$$

(where $\beta$ represents a parameter showing a degree of change in curvature, and t and $\alpha$ are determined by a length of a transition curve and a pitch circle radius of a rotation conveyance body)

$$c_4(s) = \left(\int_0^s \cos\left\{\int_0^\sigma \frac{1}{R} \cdot \sin^2\left[\frac{\pi}{2}\left(\frac{\tau}{s_R}\right)^n\right]d\tau\right\}d\sigma,\right. \quad \text{Math. 4]}$$
$$\left.\int_0^s \sin\left\{\int_0^\sigma \frac{1}{R} \cdot \sin^2\left[\frac{\pi}{2}\left(\frac{\tau}{s_R}\right)^n\right]d\tau\right\}d\sigma\right)$$

(where it is defined that a curvature $\kappa$ of a transition curve changes by a following function $$\kappa = \frac{1}{R} \cdot \sin^2\left[\frac{\pi}{2}\left(\frac{s}{s_R}\right)^n\right]$$

where s represents a length of a curve (parameter), $S_R$ represents a length of a transition curve, R represents a pitch circle radius of a rotation conveyance body, and n represents a parameter showing a degree of change in curvature).

4. A device for conveying an article between rotation conveyance bodies, the device comprising:
a transferring-side rotation conveyance body having pockets at even intervals at an outer peripheral part thereof;
a transferred-side rotation conveyance body having pockets at even intervals at an outer peripheral part thereof, the transferring-side rotation conveyance body and the transferred-side rotation conveyance body having a prescribed gap between pitch circles thereof; and
a conveyance guide guiding conveyance of the article along a prescribed track between the transferring-side rotation conveyance body and the transferred-side rotation conveyance body, the conveyance guide having a guide surface having a shape of an offset transition curve obtained by offsetting a transition curve with a curvature that continuously varies from a first pitch circle curvature of the transferring-side rotation conveyance body before transfer to a second pitch circle curvature of the transferred-side rotation conveyance body after the transfer, wherein
one of the transferring-side rotation conveyance body and the transferred-side rotation conveyance body has a reduced pitch circle radius without a change in positions of axes of virtual rotation conveyance bodies that transfer the article with pitch circles thereof contacting each other,
a conveyance speed between the rotation conveyance bodies continuously varies from a peripheral speed of the transferring-side rotation conveyance body before the transfer to a peripheral speed of the transferred-side rotation conveyance body after the transfer, and
a ratio between angular speeds of the transferring-side rotation conveyance body and the transferred-side rotation conveyance body is equal to a ratio between inverse numbers of the number of pockets of the respective rotation conveyance bodies.

5. The device for conveying the article according to claim 4, wherein
the transition curve is represented by any of curves $c_1$ to $c_4$ calculated by any of following mathematical formulae 1 to 4

$$c_1(s) = \left[\frac{1}{\alpha}\int_0^{\alpha \cdot s} \cos\left(\frac{\sigma^2}{2}\right)d\sigma, \frac{1}{\alpha}\int_0^{\alpha \cdot s} \sin\left(\frac{\sigma^2}{2}\right)d\sigma\right] \quad \text{[Math. 1]}$$

(where s represents a length of a curve, and $\alpha$ is determined by a length of a transition curve and a pitch circle radius of a rotation conveyance body)

$$c_2(s) = \left\{\int_0^s \cos\left[\frac{\sigma^{n+1}}{R \cdot s_R^n(n+1)}\right]d\sigma, \int_0^s \sin\left[\frac{\sigma^{n+1}}{R \cdot s_R^n(n+1)}\right]d\sigma\right\} \quad \text{[Math. 2]}$$

(where, it is defined that a curvature κ of a transition curve changes by a following function $$\kappa = \frac{1}{R} \cdot \left(\frac{s}{S_R}\right)^n$$

where s represents a length of a curve, $S_R$ represents a length of a transition curve, R represents a pitch circle radius of a rotation conveyance body, and n represents a parameter showing a degree of change in curvature)

$$c_3(t) = \left[\frac{\beta}{\alpha}\int_0^{\alpha t}\cos\left(\frac{\tau^2}{2}\right)d\tau, \frac{1}{\alpha}\int_0^{\alpha t}\sin\left(\frac{\tau^2}{2}\right)d\tau\right] \quad [\text{Math. 3}]$$

(where β represents a parameter showing a degree of change in curvature, and t and α are determined by a length of a transition curve and a pitch circle radius of a rotation conveyance body)

$$c_4(s) = \left(\int_0^s \cos\left\{\int_0^\sigma \frac{1}{R}\cdot\sin^2\left[\frac{\pi}{2}\left(\frac{\tau}{S_R}\right)^n\right]d\tau\right\}d\sigma, \quad [\text{Math. 4}]$$
$$\int_0^s \sin\left\{\int_0^\sigma \frac{1}{R}\cdot\sin^2\left[\frac{\pi}{2}\left(\frac{\tau}{S_R}\right)^n\right]d\tau\right\}d\sigma\right)$$

(where, it is defined that a curvature κ of a transition curve changes by a following function $$\kappa = \frac{1}{R} \cdot \sin^2\left[\frac{\pi}{2}\left(\frac{s}{S_R}\right)^n\right]$$

where s represents a length of a curve (parameter), $S_R$ represents a length of a transition curve, R represents a pitch circle radius of a rotation conveyance body, and n represents a parameter showing a degree of change in curvature).

6. The device for conveying the article according to claim 5, wherein the pockets of the rotation conveyance bodies form article guide parts of which arc-shaped opening ends protrude outward from corresponding pitch circles, and the article guide parts and the pockets are shaped so as to come in contact with the article conveyed at the conveyance speed continuously varying from the peripheral speed of the transferring-side rotation conveyance body before the transfer to a peripheral speed of the transferred-side rotation conveyance body after the transfer.

\* \* \* \* \*